United States Patent Office 3,410,761
Patented Nov. 12, 1968

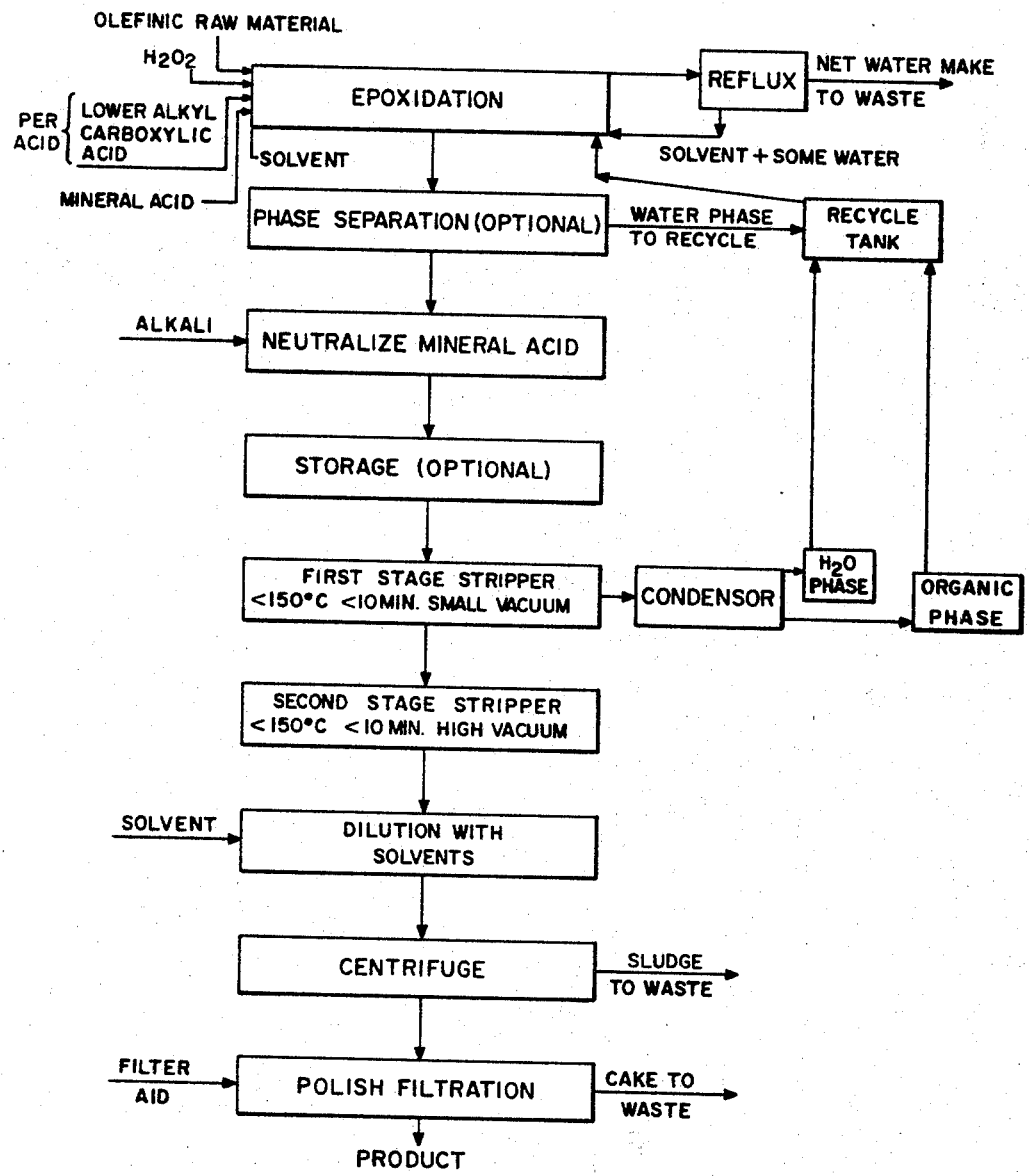

3,410,761
RECOVERY OF EPOXY POLYBUTADIENE BY PLURAL STAGE FLASH DISTILLATION
Gerald H. Slattery, Pasadena, Md., assignor to FMC Corporation, New York, N.Y., a corporation of Delaware
Filed Apr. 28, 1966, Ser. No. 546,100
3 Claims. (Cl. 203—37)

ABSTRACT OF THE DISCLOSURE

A process for recovering epoxy polybutadiene from a heterogeneous reaction mixture containing epoxy polybutadiene, an aqueous acid solution and residual peroxygen compound by separating epoxy polybutadiene from volatile impurities in two stages, the first being a continuous flash distillation at less than 150° C. for less than 10 minutes, the overhead being condensed and recycled to the epoxidizing step, followed by a second flash distillation at less than 150° C. and for less than 10 minutes and thereafter separating the epoxy polybutadiene product from nonvolatile impurities which are insoluble therein by conventional solid-liquid separation means without washing the product.

---

This invention relates to the epoxidation of viscous organic materials such as unsaturated oils and unsaturated polymers, and aims to provide a process of this sort in which the difficulties previously encountered in recovering product from such systems are minimized. In particular, it relates to epoxidations in heterogeneous systems involving an unsaturated material which is immiscible with water, and an aqueous phase containing hydrogen peroxide and/or an organic peracid, with or without a mineral acid catalyst.

The epoxidation of organic unsaturated materials is widely practiced in order to improve the properties of these materials for various uses. Unsaturated glycerides, such as soybean oil, for example, are often epoxidized to produce materials which are satisfactory plasticizers for polyvinyl chloride. And unsaturated polymers such as polybutadiene may be epoxidized to produce epoxypolybutadienes, which are valuable plastics.

These epoxidation reactions are often conducted in a two-phase reaction system, one phase of which consists of the unsaturated oily liquid to be epoxidized, generally together with a solvent, and an aqueous phase consisting of water, and an epoxidizing agent such as peracetic or performic acid, most often formed in situ from hydrogen peroxide and the acid, often with a mineral acid catalyst such as phosphoric or sulfuric acid. This heterogeneous reaction proceeds by the equilibration of the organic peracid between the water and the oil phase, the reaction occurring in the oil phase to produce the epoxidized oily material and the organic acid, which then reequilibrates to the water phase to reform the peracid.

These reactions have certain inherent difficulties. As the oils increase in molecular weight, gels are often formed which in turn form stable emulsions intermediate in density between the water and oil phases, thus greatly complicating product isolation. Where mineral acids are used, they must be neutralized, and the inorganic salts formed further complicate the problem of separating the water and the oil phases and recovering useful product. Procedure in the past has been to separate the water phase from the oil phase, and then wash the salt and excess reagent from the oil phase. Obviously, this is a complicated process, and very often results in susbtantial loss of product and reagents.

This invention has for its principal object the provision of an improved method of recovering product from a heterogeneous epoxidation system in which the product is recovered in greater yield, and the excess reagents are largely recovered. These and other objectives are obtained in accordance with this invention by the procedures hereinafter described.

According to the instant invention a heterogeneous epoxidation reaction of an unsaturated oleaginous material is carried out by contacting the material with an aqueous solution of a peracid under conditions which produce the desired epoxidation, thereafter continuously stripping any volatile materials present at a temperature of the order of 150° C., or less, with a residence time of less than 10 minutes, at such a pressure that the volatiles can be readily condensed for reuse, and recovering the volatiles and recycling them, minus the net make of water in the process, to the reactor, along with additional material to start a fresh batch, separating any gel or salt in the product as by filtration or centrifugation, and finally recovering the product.

In general, after stripping the product will contain minor quantities of the peracid and/or hydrogen peroxide. These can, if desired, be destroyed by the addition of reducing reagents, after which a second stripping follows to remove volatile impurities. Generally, however, the second stage stripping is sufficient to destroy residual peracid, so that the addition of reducing reagents is unnecessary. After the second stage stripping the product, if it is too viscous to separate from the gel and any salt present, is dissolved in a suitable solvent, so that it can be handled easily to permit a good separation of the nonvolatile impurities from the product. If desired, a stabilizer such as quinone can be added along with the solvent before separation of the nonvolatile impurities.

The drawing attached hereto is a block flow diagram showing the most complicated operation of the invention, where the product to be epoxidized is treated with a peracid formed in situ from hydrogen peroxide with mineral acid catalysis, so that a neutralization step is necessary.

As shown in the drawing, the olefinic material or polymer to be epoxidized is fed into an epoxidation reaction along with hydrogen peroxide, a lower aliphatic carboxylic acid such as formic or acetic acid, a mineral acid such as phosphoric acid and a solvent such as benzene. The epoxidation is continued to the desired degree under reflux with the solvent and part of the water being returned to the epoxidation reactor, any water formed in the reaction (net water make) being taken overhead. The time of the reaction and the temperature vary with the product to be epoxidized in known fashion, and the details do not form any part of this invention.

After the epoxidation reaction is completed, the aqueous phase may optionally be separated by centrifugation, and the water phase recycled to the reactor via a hold up tank. In the typical case, however, caustic soda solution is added directly to the two phase reaction mixture to neutralize the mineral acid present, and the reaction mixture is cooled and stored as desired for a maximum period of 10 hours.

Heretofore, it has been customary to separate the organic phase from the water phase at this point, and wash out residual materials to obtain product. However, in accordance with this invention the reaction mixture is fed to a continuous stripping still under reduced pressure at a temperature of the order of 150° C. or less (depending on the stability of the product) with a residence time of under 10 minutes. The condenser pressure is kept high enough to permit ready condensation with cooling water, e.g., 100–400 mm. The overhead goes to a condenser; after condensation, the organic solvent separates from the water phase and both phases are recycled back to the epoxidation vessel along with fresh new material and the necessary make up of reagents. In general, a very substantial amount of the peroxygen compound can be recovered by this technique. Because of the continuous manner of the stripping, however, and the extreme dilution of the peroxygen compounds in the vessel, there is no explosion hazard inherent in the stripping operations.

Residual traces of reactants and solvents not removed in the first stripper, are removed in another stripping still at temperatures of the order of 140–150° C. and at pressure sufficiently low to remove volatiles in less than 10 minutes; in general a vacuum of about 5 mm. of mercury is adequate. After stripping the product is ready for separation of the sludge, by filtration or centrifugation. Where the products are highly viscous, solvents are added, to get the desired final viscosity of the product, and stabilizers such as quinone may be added at this point. The product is then centrifuged hot for best results. The bulk of the undesired impurities are centrifuged out; a polish filtration completes clean-up of the product. No washing is necessary.

In many epoxidations it is not necessary to use mineral acid, since organic acid will catalyze many epoxidations. In such event, the neutralization step may be omitted.

The following examples are given by way of illustration of the invention and not for purposes of limitation:

*Example 1.—Epoxidation of polybutadiene in benzene with no mineral catalyst*

A standard epoxidation of polybutadiene was conducted in benzene solvent at reflux temperature without use of phosphoric acid catalyst. The following recipe was used: 800 g. of polybutadiene, 1600 g. of benzene, 120 g. of 90% formic acid, and 800 g. of 50% hydrogen peroxide. The hydrogen peroxide was added over a period of one hour. After an additional hour, a sample of the reaction mixture, on analysis, was found to contain 8.89% oxirane oxygen and had a viscosity of 2120 poises. After an additional thirty minutes at reaction temperature, the mixture was cooled and partially (10%) neutralized by the addition of 6.9 g. of 50% sodium hydroxide solution.

The mixture was then stripped continuously (first stage) through a stainless steel stripper with a resident time of ten minutes at atmospheric pressure. The steam pressure was 54 p.s.i.g. corresponding to a temperature of 150° C. The temperature of the resin emerging from the stripper was 123° C. The stripped resin contained 0.2% hydrogen peroxide and was free of formic acid. The aqueous layer of the distillate contained 2.2% hydrogen peroxide and 1.4% formic acid. The stripped resin was then second stage stripped in a second still at 5 mm. of mercury to remove all volatile material, and the product was dissolved in xylene to the desired viscosity for sale and filtered.

Samples before and after stripping were analyzed by dissolving in benzene, water-washing, centifuging, drying (anhydrous magnesium sulfate), filtering, and stripping in vacuo. The analytical results are:

|  | Percent Oxirane Oxygen | Viscosity, poises |
|---|---|---|
| Before Partial Neutralization | 9.13 | 2,840 |
| After First Stage | 9.27 | 3,488 |
| After Second Stage | 9.20 | 3,600 |

*Example 2.—Epoxidation as in Example 1 with xylene solvent*

A standard epoxidation of polybutadiene was conducted in xylene solvent at 60–65° C. without the use of a mineral acid catalyst using the following recipe: polybutadiene 100 parts, xylene 200 parts, formic acid (90%) 15 parts, hydrogen peroxide (50%) 100 parts. After completion of the epoxidation reaction (2 hours), a sample of product analyzed 8.96% oxirane oxygen and 2400 poises. This reaction mixture was then stripped continuously (first stage) through a 304 stainless steel stripper at atmospheric pressure at 147° C. under such conditions that the residence time in the stripper was less than 10 minutes. The analysis of the stripped resin showed an oxirane oxygen of 8.74%, a viscosity of 2640 poises, a xylene content of 3.6%, an $H_2O_2$ content of 1.0% and a formic acid content of 2.7%. This material was then stripped at 145° C. under vacuum (5 mm. Hg—second stage) to remove all volatile material, and then filtered to remove a slight gel haze. The analysis of the final product was 8.7% oxirane oxygen and 2750 poise viscosity. The distillate from the first stage contained 4.7 parts of 100% $H_2O_2$ and 4.2 parts of formic acid. The usage, yield and recovery of this reagent is:

| Component | Charge | Recovered | Net Consumed | Percent Recovered |
|---|---|---|---|---|
| $H_2O_2$ (100%) | 50 | 4.7 | 45.3 | 9.4 |
| Formic Acid | 15 | 4.7 | 10.3 | 31.3 |

*Example 3.—No mineral acid catalyst, xylene solvent*

A standard epoxidation of polybutadiene was conducted in xylene solvent at 70–75° C. without the use of mineral acid catalyst using the same recipe as listed in Example No. 2. After completion of the epoxidation reaction (2 hours), a sample of the product analyzed 9.12% oxirane oxygen, and 2640 poise viscosity. This reaction mixture was then continuously stripped (first stage) through a 304 stainless steel stripper at 50 mm. Hg absolute pressure and 100° C. at less than 10 minutes residence time. This first stage product contained 96.3% resin, 0.34% $H_2O_2$ and 1.2% xylene solvent. That material was then second stage stripped at 150° C., and 5 mm. Hg absolute pressure producing a final product of 9.19% oxirane oxygen and 3120 poise viscosity. This viscosity increase of 18.3% over the still could be reduced by utilizing a very low residence time still. A polish filtration removed the trace of gel present and no peroxide or acid values were detected. The distillate from the first stage contained 12.9 parts of 100% $H_2O_2$ and 7.6 parts of formic acid. The usage and reagent recovery in this experiment was:

| Component | Charge | Recovered | Net Consumed | Percent Recovered |
|---|---|---|---|---|
| $H_2O_2$ (100%) | 50 | 12.9 | 37.1 | 25.8 |
| Formic Acid (90%) | 15 | 7.6 | 7.4 | 49.4 |

*Example 4.—No mineral acid catalyst, xylene solvent partial neutralization*

A standard epoxidation of polybutadiene was conducted in xylene solvent at 60–65° C. without the use of mineral acid catalyst, using the same recipe as listed in Example No. 2. After completion of the epoxidation reaction (2 hours), a sample of the product analyzed 8.66% oxirane oxygen and 1840 poise viscosity. Sufficient sodium hydroxide was then added to the reaction mixture to neutralize 4.6% of the acid present (formic acid) and this partially neutralized mixture was then continuously stripped (first stage) in a 304 jacketed pipe stripper at atmospheric pressure and 140° C. at a low residence time. This first stage product contained 89.3% resin, 1.1% $H_2O_2$ and no formic acid with the balance of 9.6% being xylene solvent. This material was second stage stripped at 150° C. and 5 mm. Hg absolute pressure producing a final product of 8.66% oxirane oxygen and 1960 poise viscosity. This partial neutralization operation is responsible for holding down the increase in viscosity to 6.5%, but at a price in reduced recovery of reagents as shown:

| Component | Charge | Recovered | Consumed | Percent Recovered |
|---|---|---|---|---|
| $H_2O_2$ (100%) | 50 | 3.3 | 46.7 | 6.6 |
| Formic Acid (90%) | 15 | 2.1 | 12.9 | 14.0 |

A polish filtration was then required to remove gel and salts from the final product.

*Example 5.—Mineral acid catalysis in benzene solvent*

A standard epoxidation of polybutadiene was conducted in benzene solvent at 65° C. using phosphoric acid catalyst according to the following recipe: polybutadiene 100 parts, benzene 200 parts, phosphoric acid 0.8 part, formic acid 8 parts, hydrogen peroxide (50%) 90 parts. After completion of the epoxidation reaction (3 hours), a sample of the product analyzed 9.02% oxirane oxygen and 1640 poise viscosity. Sufficient sodium hydroxide was then added to neutralize the phosphoric acid present (pH 6.6) and this neutralized mixture was then continuously stripped (first stage) at 100 mm. Hg absolute pressure and 100° C. at a low residence time. This first stage product contained 96% resin, 0.1% $H_2O_2$ and no formic acid with the balance being salts and benzene solvent. This mixture was then second stage stripped at 150° C. and 5 mm. Hg absolute pressure to form a dry, salt and gel laden resin which was then centrifuged to remove solids thus producing a final product which analyzed 8.91% oxirane oxygen, 2672 poise viscosity. The viscosity increase over this operation was 63%. All unreacted hydrogen peroxide and formic acid was decomposed or neutralized, so no reagent recovery was possible.

*Example 6.—Mineral acid catalysis in benzene with one liquid phase separation operation*

A standard epoxidation of polybutadiene was conducted at 70° C. using the recipe: polybutadiene 100 parts, benzene 200 parts, 50% $H_2O_2$ 90 parts, 90% formic acid 10 parts, 85% phosphoric acid 1 part. After completion of the epoxidation reaction (3 hours), a sample of the product analyzed 9.05 oxirane oxygen and 1938 poise viscosity. This mixture of aqueous phase, oil phase and solids-gel phase was then passed to a liquid-liquid phase centrifugal separator and the water phase collected for recycle to the epoxidation unit. The oil phase containing dispersed gel solids was then completely neutralized by adding sodium hydroxide and this neutral mixture was then continuously stripped (first stage) at atmospheric pressure and 140° C. at a low residence time. This material was then immediately passed to the second stage stripper which operated at 150° C. and 5 mm. Hg absolute pressure. This resin, laden with dry salt and gel was then filtered to remove the solids and the final resin product analyzed as 9.04% oxirane oxygen and 3060 poise viscosity (58% viscosity increase). The net make of water was distilled from the separated water phase and this water phase was recycled to the epoxidizer to recover the unreacted reagents as shown:

| Component | Charge | Recovered | Consumed | Percent Recovered |
|---|---|---|---|---|
| $H_2O_2$ (100%) | 45 | 7.0 | 38 | 15.5 |
| Formic Acid (90%) | 10 | 4.0 | 6 | 40.0 |

Obviously, the examples can be multiplied indefinitely without departing from the scope of the claims herein.

I claim:
1. In the process of recovering epoxy polybutadiene from a heterogeneous reaction mixture containing the epoxy polybutadiene, an organic material, an aqueous acid solution and residual peroxygen compound, the improvement which comprises separating the epoxy polybutadiene from volatile impurities in two stages, the first stage being a continuous flash distillation in which the epoxy polybutadiene is exposed to a temperature not in excess of about 150° C., for not in excess of 10 minutes, and the overhead is condensed and recycled to the epoxidizing step, the second stage being a second continuous flash distillation at a temperature not in excess of about 150° C. for not in excess of 10 minutes distillation time, whereby essentially all the remaining volatile impurities are stripped from the epoxidized material, and thereafter separating the epoxy polybutadiene product from the nonvolatile impurities which are insoluble therein by conventional solid-liquid separation means without washing the product.

2. The method of claim 1, in which the product is diluted with a solvent after removal of the volatile impurities and before separation of the nonvolatile impurities.

3. The method of claim 1, in which the heterogeneous reaction mixture contains a mineral acid in solution, and the mineral acid is neutralized before separation of the impurities.

References Cited

UNITED STATES PATENTS

| | | | |
|---|---|---|---|
| 2,884,362 | 4/1959 | Bloom et al. | 203—91 |
| 2,889,257 | 6/1959 | Griffin et al. | 203—47 |
| 2,994,645 | 8/1961 | Jones et al. | 203—80 |
| 3,011,955 | 12/1961 | Brown | 203—88 |
| 3,022,322 | 2/1962 | Wheelock | 260—348.5 |
| 3,030,336 | 4/1962 | Greenspan et al. | 260—348.5 |
| 3,130,207 | 4/1964 | Greenspan et al. | 260—348.5 |
| 3,162,678 | 12/1964 | Hayes | 203—80 |
| 3,280,091 | 10/1966 | Dance | 203—88 |

WILBUR L. BASCOMB, JR., *Primary Examiner.*